US011558587B2

(12) United States Patent
Jang et al.

(10) Patent No.: US 11,558,587 B2
(45) Date of Patent: Jan. 17, 2023

(54) CAMERA MODULE COMPRISING COMPLEMENTARY COLOR FILTER ARRAY AND ELECTRONIC DEVICE COMPRISING SAME

(71) Applicant: Samsung Electronics Co., Ltd., Suwon-si (KR)

(72) Inventors: Soongeun Jang, Suwon-si (KR); Ildo Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 14 days.

(21) Appl. No.: 16/759,246

(22) PCT Filed: Jul. 26, 2018

(86) PCT No.: PCT/KR2018/008488
§ 371 (c)(1),
(2) Date: Apr. 24, 2020

(87) PCT Pub. No.: WO2019/055407
PCT Pub. Date: May 9, 2019

(65) Prior Publication Data
US 2020/0374493 A1 Nov. 26, 2020

(30) Foreign Application Priority Data
Nov. 6, 2017 (KR) .................. 10-2017-0146917

(51) Int. Cl.
*H04N 9/04* (2006.01)
*H04N 5/225* (2006.01)
*H04N 9/73* (2006.01)

(52) U.S. Cl.
CPC ....... *H04N 9/04551* (2018.08); *H04N 5/2254* (2013.01); *H04N 9/735* (2013.01)

(58) Field of Classification Search
CPC .. H04N 9/04551; H04N 5/2254; H04N 9/735; H04N 9/04553; H04N 9/04561;
(Continued)

(56) References Cited

U.S. PATENT DOCUMENTS 8,134,582 B2 * 3/2012 Asao ................ G02F 1/133514
345/694
2006/0023093 A1 * 2/2006 Tan .......................... H04N 9/09
348/263
(Continued)

FOREIGN PATENT DOCUMENTS

JP 2001-250931 A 9/2001
KR 10-0769548 B1 10/2007
(Continued)

OTHER PUBLICATIONS

International Search Report and Written Opinion of the International Searching Authority in connection with International Application No. PCT/KR2018/008488 dated Oct. 22, 2018, 15 pages.
(Continued)

*Primary Examiner* — Abdelaaziz Tissire

(57) ABSTRACT

A camera module according to various embodiments of the present invention comprises a lens module including at least one lens, and an image sensor module coupled to the lens module, wherein the image sensor module comprises a micro lens, at least one photodiode, and a filter array, the filter array includes a first filter capable of transmitting light of a first designated band and a second filter capable of transmitting light of a second designated band corresponding to a color having a complementary color relationship with another color corresponding to the first designated band, and the filter array may be disposed between the micro lens and the at least one photodiode. Various other embodiments are possible.

13 Claims, 15 Drawing Sheets

(58) Field of Classification Search
CPC ........ H04N 9/045; H04N 1/6086; H04N 9/73; H04N 2209/043–046; H04N 9/67; H04N 9/76; G02B 5/28
See application file for complete search history.

(56) References Cited

U.S. PATENT DOCUMENTS

| | | | |
|---|---|---|---|
| 2008/0231730 A1* | 9/2008 | Tsuruoka | H04N 9/04515 348/229.1 |
| 2008/0266418 A1 | 10/2008 | Imai et al. | |
| 2009/0115874 A1* | 5/2009 | Kim | H04N 9/04557 348/340 |
| 2009/0295962 A1* | 12/2009 | Rhodes | H04N 9/04557 348/302 |
| 2010/0085433 A1 | 4/2010 | Choe et al. | |
| 2010/0128149 A1 | 5/2010 | Kim et al. | |
| 2010/0165110 A1* | 7/2010 | Ohara | H04N 9/0451 348/E5.09 |
| 2010/0277628 A1* | 11/2010 | Sawada | H04N 5/23245 348/280 |
| 2013/0050562 A1* | 2/2013 | Nakata | A61B 5/14552 348/E9.003 |
| 2013/0087875 A1* | 4/2013 | Kobayashi | H04N 5/232122 257/432 |
| 2013/0093929 A1* | 4/2013 | Kouyama | H04N 9/04559 348/273 |
| 2016/0056200 A1* | 2/2016 | Lee | H01L 27/14603 257/292 |
| 2017/0040364 A1 | 2/2017 | Oh et al. | |
| 2017/0264891 A1 | 9/2017 | Iwasaki | |
| 2018/0063456 A1* | 3/2018 | Lee | H04N 5/23212 |
| 2019/0378258 A1* | 12/2019 | Fan | H04N 5/33 |

FOREIGN PATENT DOCUMENTS

| | | |
|---|---|---|
| KR | 10-0912873 B1 | 8/2009 |
| KR | 10-2010-0039120 A | 4/2010 |
| KR | 10-2014-0113923 A | 9/2014 |
| KR | 10-1534547 B1 | 7/2015 |
| KR | 10-2016-0114374 A | 10/2016 |
| KR | 10-2017-0018206 A | 2/2017 |
| WO | 2016038997 A1 | 3/2016 |

OTHER PUBLICATIONS

Hirakawa, Keigo, et al., "Spatio-Spectral Color Filter Array Design for Optimal Image Recovery," IEEE Transactions on Image Processing, vol. 17, No. 10, Oct. 10, 2008, 15 pages.

* cited by examiner

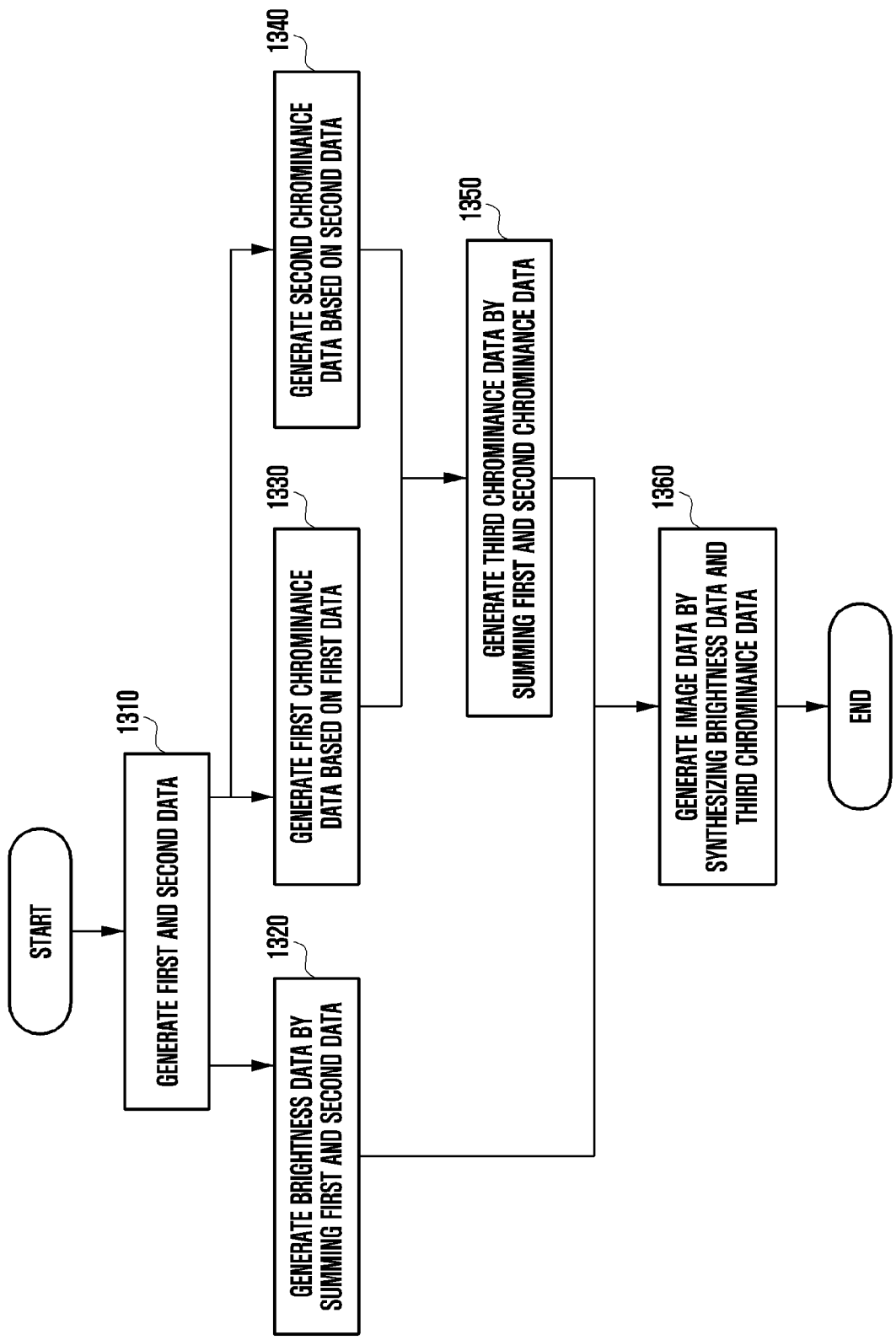

US 11,558,587 B2

CAMERA MODULE COMPRISING COMPLEMENTARY COLOR FILTER ARRAY AND ELECTRONIC DEVICE COMPRISING SAME

CROSS-REFERENCE TO RELATED APPLICATIONS

This application is a 371 National Stage of International Application No. PCT/KR2018/008488, filed Jul. 26, 2018, which claims priority to Korean Patent Application No. 10-2017-0146917, filed Nov. 6, 2017, the disclosures of which are herein incorporated by reference in their entirety.

BACKGROUND

1. Field

The disclosed embodiments relate to a camera module and, in particular, to a camera module for sensing an image signal, an electronic device including the camera module, and an image data generation method of the camera module and the electronic device.

2. Description of Related Art

A camera module is equipped with an image sensor that generates an analog signal corresponding to incident light sensed by unit pixels and converts the analog signal to a digital signal to generate an image of an external object. In line with the diversification of portable electronic devices (hereinafter, referred to as "electronic devices") such as a smartphone and a tablet personal computer (PC), the image sensor has become a common component across the range of electronic devices for implementing various features.

SUMMARY

In order for a camera device (or an electronic device equipped with a camera module) to sense an accurate image, it is necessary to enhance the sensitivity of an image sensor. Here, the sensitivity of the image sensor may be defined as a number of photons being sensed by the image sensor during an exposure time of the image sensor.

Although various methods have been proposed as conventional technologies for improving the sensitivity of an image sensor, the conventional technologies have a drawback of a processing delay caused by an excessive computation amount, a drop in resolution, or an increase of a unit pixel size (e.g., pixel pitch).

The various disclosed embodiments aim to provide a camera module and an electronic device that are capable of improving the sensitivity of an image sensor and processing an image with a small computation amount.

According to various disclosed embodiments, a camera module includes a lens module comprising at least one lens and an image sensor module connected to the lens module, wherein the image sensor module includes a micro lens, at least one photo diode, and a filter array including a first filter passing a first designated band of light and a second designated filter passing another band of the light, the first and second designated bands corresponding to colors complementary to each other, and arranged between the micro lens and the at least one photo diode.

According to various disclosed embodiments, an electronic device includes a camera module and an image signal processor, wherein the camera module includes a micro lens, at least one photo diode for converging light passing the micro lens to an electric signal, and a filter array arranged between the micro lens and the at least one photo diode and comprising a first filter passing a first designated band of the light and a second filter passing a second designated band of the light, the first and second designated bands corresponding to colors complementary to each other and the image signal processor being configured to generate image data based on data output from the at least one photo diode.

According to various disclosed embodiments, an image data generation method of a camera module including a micro lens, at least one photo diode arranged to correspond to the micro lens, and a filter array arranged between the micro lens and the at least one photo diode includes generating first data based on light sensed in a first area of the at least one photo diode, generating second data based on the light sensed in a second area of the at least one photo diode, and generating image data based on the first and second data, the first and second data corresponding to colors complementary to each other.

The various disclosed embodiments are advantageous in terms of providing a camera module and an electronic device that are capable of improving the sensitivity of an image sensor and processing an image with a small computation amount, particularly with the least configuration change of a conventional camera system.

BRIEF DESCRIPTION OF THE DRAWINGS

FIG. 13 is a flowchart illustrating an image data generation method according to various embodiments.

DETAILED DESCRIPTION

Figure 1:
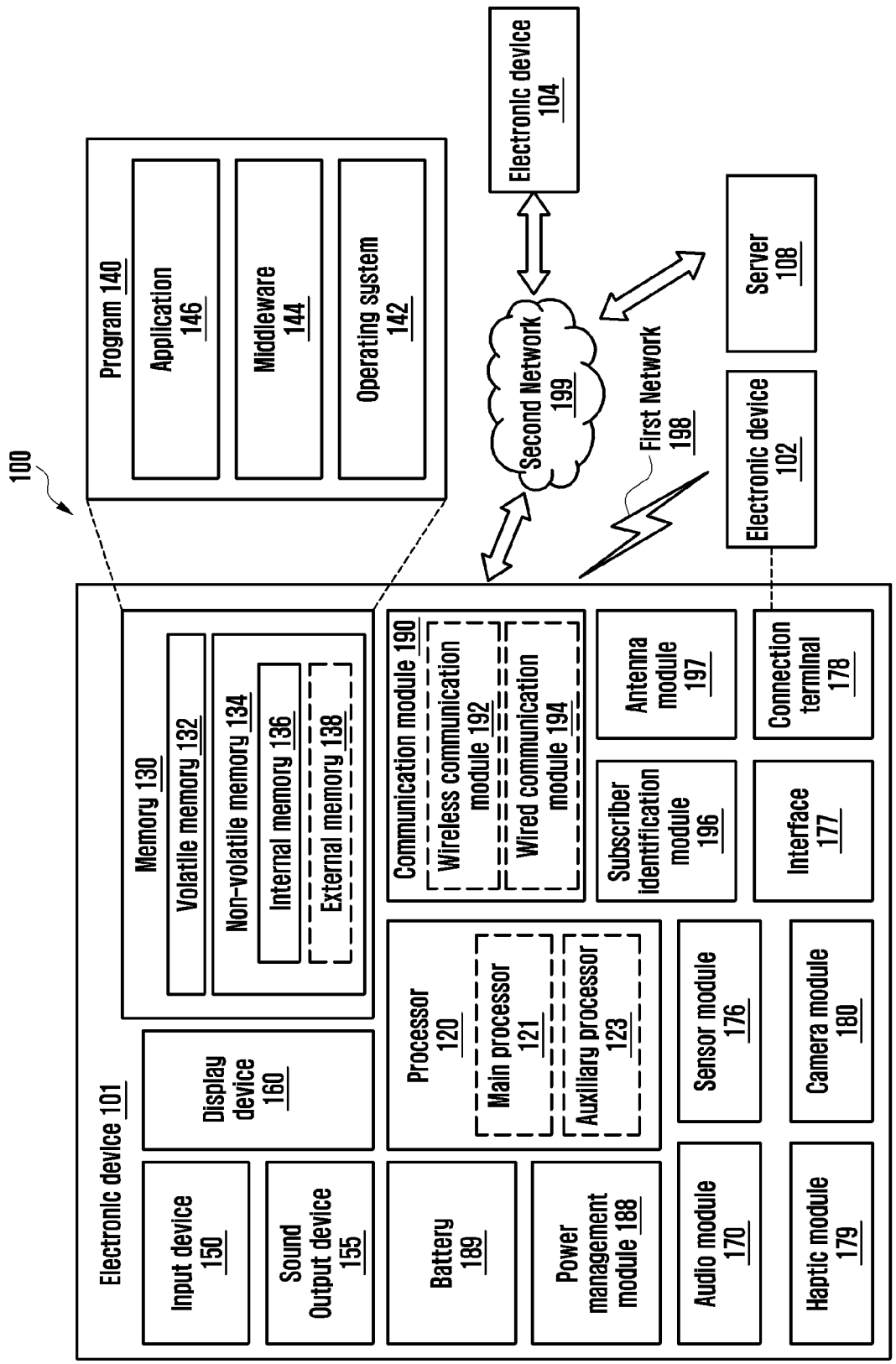
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
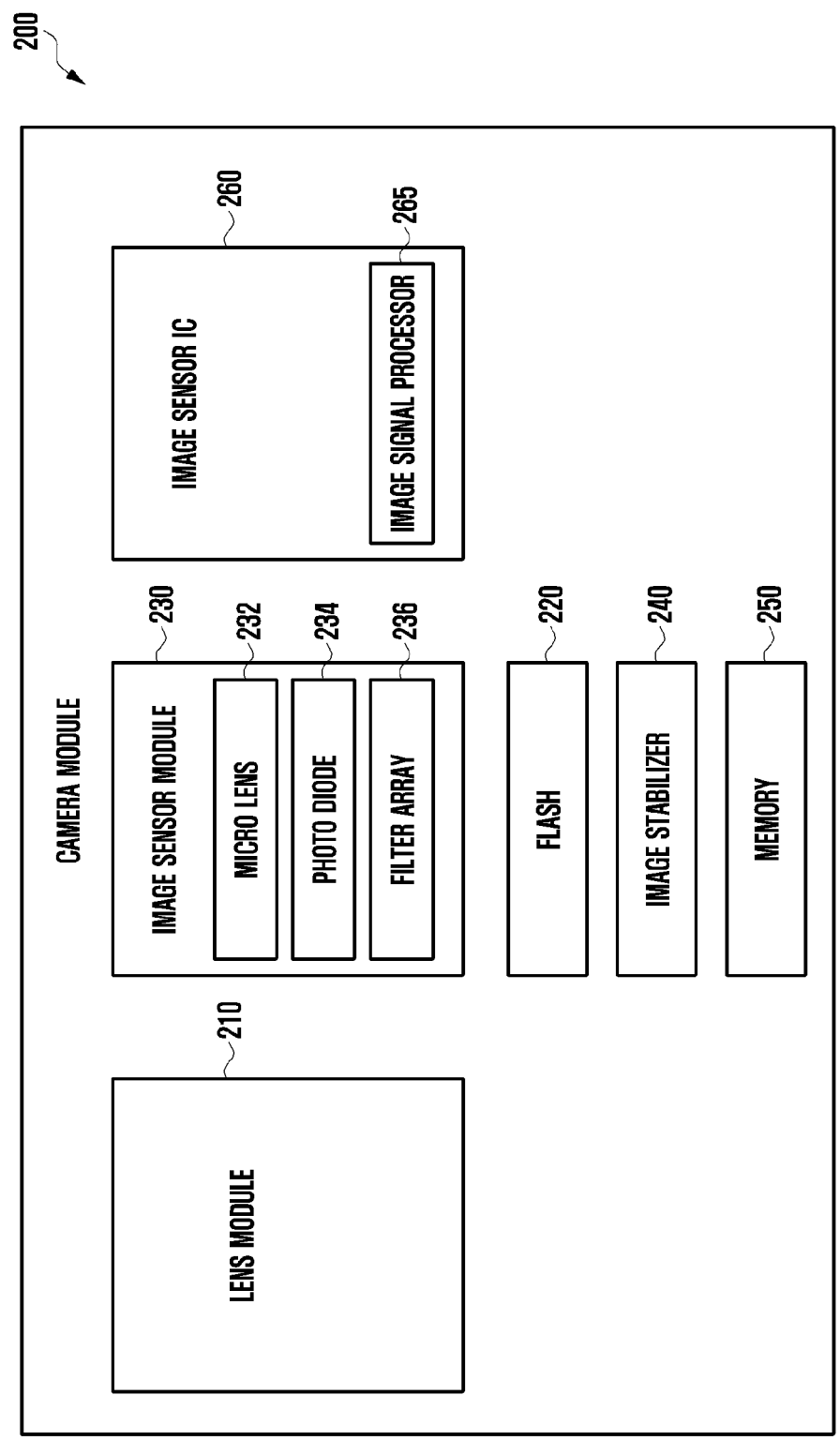
FIG. 2 is a block diagram illustrating a configuration of a camera module according to various embodiments

FIG. 2 is a block diagram illustrating a configuration of a camera module 200 according to various embodiments.

In reference to FIG. 2, the camera module 200 may include a lens module 210, a flash 220, an image sensor module 230, an image stabilizer 240, a memory 250 (e.g., buffer memory), or an image signal processor 265 of which at least some may be omitted or replaced according to various disclosed embodiments. The camera module 200 may be included in an electronic device (e.g., electronic device 101 in FIG. 1) and send acquired image data to a processor (e.g., processor 120 in FIG. 1) of the electronic device.

According to various embodiments, the lens module 210 may collect light emitted by a subject as a target of which an image is to be taken and refract the light to the image sensor module 230. The lens module 210 may include one or more lenses. According to an embodiment, the camera module 200 may include multiple lens modules 210. In this case, the camera module 200 may, by way of example, be a dual camera, a 360-degree camera, or a spherical camera. The multiple lens modules 210 may have the same lens characteristics (e.g., view angle, focal distance, autofocus, f-number, or optical zoom), or at least one of the lens modules 210 may have lens characteristics different from those of at least one other lens assembly. The lens module 210 may include a wide-angle lens or a telephoto lens.

According to various embodiments, the flash 220 may emit light to reinforce the light emitted by the subject. The flash 220 may include one or more diodes (e.g., red-green-blue (RGB) LED, white LED, infrared LED, or ultraviolet LED) or xenon lamps.

According to various embodiments, the camera module 200 may include a shutter (not shown) arranged on a front or rear side of the lens module 210 or between the front and rear sides to pass or block incident light. According to an embodiment, the camera module 200 may include an electronic shutter operating in such a way of blocking a sensing value of the image sensor module 230 with no physical shutter.

According to various embodiments, the image sensor module 230 may convert the light from the subject that passes through the lens module 210 to an electric signal to acquire an image of the subject. According to an embodiment, the image sensor module 230 may include an image sensor selected among image sensors with different characteristics such as an RGB sensor, a black and white (BW) sensor, an IR sensor, or a UV sensor, multiple image sensors with the same characteristics, or multiple image sensors with different characteristics. The individual image sensors included in the image sensor module 230 may each be implemented with a charged coupled device (CCD) sensor or a complementary metal oxide semiconductor (CMOS) sensor.

According to various embodiments, the image sensor module 230 may include a plurality of photodiodes 234 constituting pixels. The photodiodes 234 may be implemented with the same type of devices that are capable of photoelectric transformation. According to various embodiments, the photo diodes 234 may form a unit pixel, e.g., 4 photo diodes may form a single unit pixel, and in this case, each photo diode may form a subpixel. A description is made of the configuration of a unit pixel, according to an embodiment, composed of the photo diodes with reference to FIG. 3.

According to various embodiments, each photo diode 234 may be divided into multiple areas (e.g., first area and second area) such that light entering one area is not sensed at other neighboring areas.

According to an embodiment, the photo diode 234 may be divided into the first area and the second area as a floating diffusion region is activated. For example, the floating diffusion region may be formed in a lengthwise direction at the center of the photo diode. The floating diffusion region is formed to block light between both the areas divided by an electric potential rather than to physically divide the photo diode 234. Each floating diffusion region is connected to a transistor (not shown), and an image sensor IC 260 (or processor of the electronic device) may control the voltage being supplied to the transistor to activate the floating diffusion region. If the floating diffusion region is activated, it blocks light between the first and second areas, which makes it possible to sense a light intensity and/or value independently between the first and second areas. The floating diffusion region may be activated or deactivated according to a control signal from the image sensor IC 260 or the processor of the electronic device. If the floating diffusion region is activated, the photo diode 234 may read out first data corresponding to the light sensed in the first area and second data corresponding to the light sensed in the second area.

According to another embodiment, the photo diode 234 may be divided into the first and second areas by a metal film Here, the metal film may be made of one of various metals such as tungsten that light cannot penetrate. Even in this case, the photo diode 234 may also read out the first data corresponding to the light sensed in the first area and the second data corresponding to the light sensed in the second area separately. According to an alternative embodiment, the photo diode 234 may include two diodes: one corresponding the first area and the other corresponding to the second area. This is the case in which two photo diodes are arranged below one micro lens 232 to read out the first and second data from the corresponding photo diodes. In this embodiment, the metal film may be formed between the two photo diodes constituting the photo diode 234.

According to various embodiments, each photo diode 234 may have a micro lens 232 so as to correspond thereto. The micro lens 232 may refract the light passed through the lens module 210 to the photo diode 234.

According to various embodiments, a filter array 236 may be interposed between the micro lens 232 and the photo diode 234. The filter array 236 may include a first filter and a second filter for passing different bands of light per photo diode 234. According to various embodiments, the first filter may pass a first designated band of light, and the second filter may pass a second designated band of light of which a color is complementary to the color of the first designated band of light. For example, in the case where four photo diodes 234 constitute a unit pixel (e.g., one R pixel, two G pixels, and one B pixel), one photo diode may be provided with a first filter passing a red (R) light band in a visible light spectrum and a second filter passing a cyan (C) band complementary to the R light band in a corresponding manner, two photo diodes may each be provided with a third filter (or first filter of the second and third photo diodes) passing a green (G) light band in a visible light spectrum and a fourth filter (or second filter of the second and third photo diodes) passing a magenta (M) light band complementary to the G light band in a corresponding manner, and the remaining one photo diode may be provided with a fifth filter (or first filter of the fourth photo diode) passing a blue (B) light band and a sixth filter (or second filter of the fourth photo diode) passing a yellow (Y) band light complementary to the B light band in a corresponding manner. In this configuration, the image sensor module 230 may acquire brightness data corresponding to a brightness signal acquirable with a black-and-white image sensor without the black-and-white image sensor by summing a primary color signal passed through the first filter of the photo diode and a complementary color signal passed through the second filter.

According to various embodiments, the filter array 236 may include the first and second filters, a third filter for passing a third designated band (ultraviolet (UV) ray band) of light that is higher in frequency than the first and second designated bands, a fourth filter for passing a fourth designated band (infrared (IR) ray band) of light that is lower in frequency than the first and second designated bands. In this embodiment, the photo diode 234 may be divided into four areas by floating diffusion regions or barrier films, and the filter array may include the first to fourth filters arranged so that each corresponds respectively to each of the four areas. A detailed description is made thereof with reference to FIGS. 8 and 9.

According to various embodiments, the image sensor module 230 is configured with the micro lens 232, the filter array 236, and the photo diode 234 such that the photo diode 234 detects data, and how the data is detected is described in detail with reference to FIGS. 5A and 5B.

According to various embodiments, the image stabilizer 240 may move or control (e.g., read-out timing adjustment) at least one lens or the image sensor module 230 in a certain direction to compensate at least partly for any negative effect on the image to be taken (e.g., shaking of image) that is caused by any shaking of the camera module 200 or the electronic device 101 including the camera module 200. According to an embodiment, the image stabilizer 240 may, by way of example, be implemented with an optical image stabilizer to detect any motion by means of a gyro sensor (not shown) or an acceleration sensor (not shown) arranged inside or outside the camera module 200.

According to various embodiments, the memory 250 may temporarily store at least part of images taken by the image sensor module 230 for a next image processing operation thereon. For example, in the case that image capture is time-lapsed in accordance with a shutter speed or multiple images are captured at a high speed, the raw captured images (e.g., high-resolution images) may be stored in the memory 250, and copy images (e.g., low-resolution images) corresponding to the raw images may be previewed on the display device 160. Afterward, if a predetermined condition is fulfilled (e.g., user input or system command), at least part of the raw images stored in the memory 250 may be read out and processed by the image signal processor 265. According to an embodiment, the memory 250 may be implemented as at least part of the memory 130 or as a separate memory operating independently.

According to various embodiments, the image sensor IC 260 may be configured to control the components of the camera module 200 and perform image processing and may include the image signal processor 265.

According to various embodiments, the image signal processor 265 performs image processing on an image taken by the image sensor module 230 or stored in the memory 250 (e.g., depth map creation, 3-dimensional modeling, panorama creation, feature point extraction, image synthesis, or image compensation (e.g., noise canceling, resolution adjustment, brightness adjustment, blurring, sharpening, or softening)). Additionally or alternatively, the image signal processor 265 may control at least one (e.g., image sensor module 230) of the components of the camera module 200 (e.g., exposure time control or read-out timing control). The image processed by the image signal processor 265 may be re-stored in the memory 250 for additional processing or transferred to a component (e.g., memory 130, display device 160, electronic device 102, electronic device 104, or server 108) outside the camera module 200. According to an embodiment, the image signal processor 265 may be implemented as part of the processor 120 or as a separate processor operating independently of the processor. In the case of being implemented as a separate processor, the images processed by the image signal processor 265 may be displayed on the display device 160 with or without being further processed.

According to an embodiment, the electronic device 101 may include two or more camera modules with different characteristics or functions. In this case, at least one of the camera modules may be a wide-angle camera or a front camera, and at least one other camera module may be a telephoto camera or a rear camera.

According to various embodiments, the camera module 200 may generate image data based on first and second data output from each photo diode 234. For example, the camera module 200 may sum the first and second data to generate brightness data (e.g., y data, first chrominance data (e.g., U data or Cb data) based on the first data, and second chrominance data (e.g., V data or Cr data) based on the second data. The camera module 200 may generate image data by summing the brightness and the first and second chrominance data. A description is made later in detail with reference to FIGS. 6A to 6C of the operation for the camera module 200 to generate the image data based on the first and second data.

According to various embodiments, a procedure for generating the image data may be performed by the image signal processor 265 of the image sensor IC 260 of the camera module. According to an alternative embodiment, the image sensor IC 260 may have only a function of transmitting data output from the photo diodes 234 to the processor (e.g., processor 1030 in FIG. 10) of the electronic device, and the image data generation procedure may be performed by the processor of the electronic device. According to an alternative embodiment, the image sensor IC 260 may send the data output from the photo diode to a companion chip (e.g., second processor 1150 in FIG. 11) that is separately implemented in the electronic device, and the image data generation procedure may be performed by the companion chip. According to an alternative embodiment, the image data generation procedure may be performed by an external device (e.g., server) as well as by the electronic device (e.g., electronic device 1000 in FIG. 10 and electronic device 1100 in FIG. 11) equipped with the camera module 200. That is, the image data generation procedure described in the disclosure may be performed, but not limited, by the processor. The above examples are described in detail with reference to FIGS. 10 and 11.

According to various embodiments, the camera module 200 (e.g., image sensor IC 260) may adjust the white balance of the image data based on the first and second data. The camera module 200 may perform sampling at a wavelength of the data acquired from the photo diode 234 and estimate a color temperature of a light source based on a sampled value. According to various embodiments, because the first and second data may be complementary to each other (e.g., first data area RGB data and the second data are CMY data), the camera module 200 may perform sampling simultaneously in a total of 6 different bands, which improves the accuracy of a light source color temperature estimation, leading to accurate white balancing.

According to various embodiments, the camera module 200 may control a shutter based on the second data (e.g., CMY data) to set an exposure value of the image sensor module 230. Because the CMY data has a sensitivity higher than that of the RGB data (e.g., first data), the camera module 200 may set the exposure value based on the sensitivity of the CMY data and proceed to synthesize the RGB and CMY data to generate a high dynamic range (HDR) image.

According to various embodiments, the camera module 200 may control the shutter based on the first data (e.g., RGB data) to set the exposure value of the image sensor module 230. The camera module 200 may determine an exposure value based on the first data, store part of the second data in the memory 250 in order for the second data not to be saturated, and expose again, thereby acquiring the RGB and CMY data.

Figure 3:
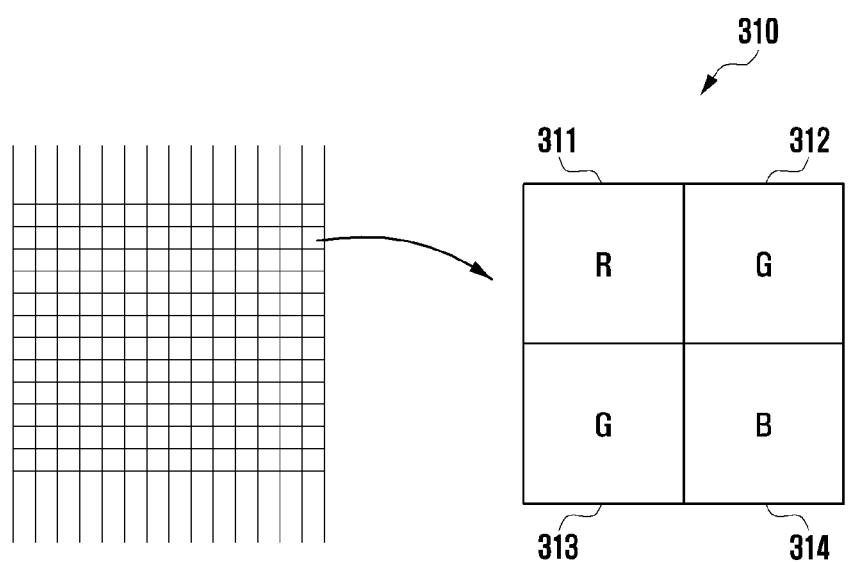
FIG. 3 is a diagram illustrating a unit pixel according to various embodiments.

FIG. 3 is a diagram illustrating a unit pixel according to various embodiments.

FIG. 3 is a diagram illustrating a unit pixel in the situation where a first area and a second area are not separated by a floating diffusion region formed but not activated therebetween or a barrier film formed between corresponding photo diodes.

As shown in the drawing, the image sensor module (e.g., image sensor module 230 in FIG. 2) may include multiple photo diodes 310 (e.g., photo diodes 234 in FIG. 2). The multiple photo diodes 310 may have respective micro lenses (e.g., macro lens 232 in FIG. 2) corresponding thereto, and a filter array (e.g., filter array 236 in FIG. 2) may be arranged between the photo diodes and the micro lenses. A photo diode and a filter array may form at least one pixel.

As shown in the drawing, a unit pixel may be composed of four photo diodes 311, 312, 313, and 314 that are each arranged with one of R, G, and B band filters in a corresponding manner. The photo diodes 311, 312, 313, and 314 may each output one of R, G, and B signals.

Figure 4:
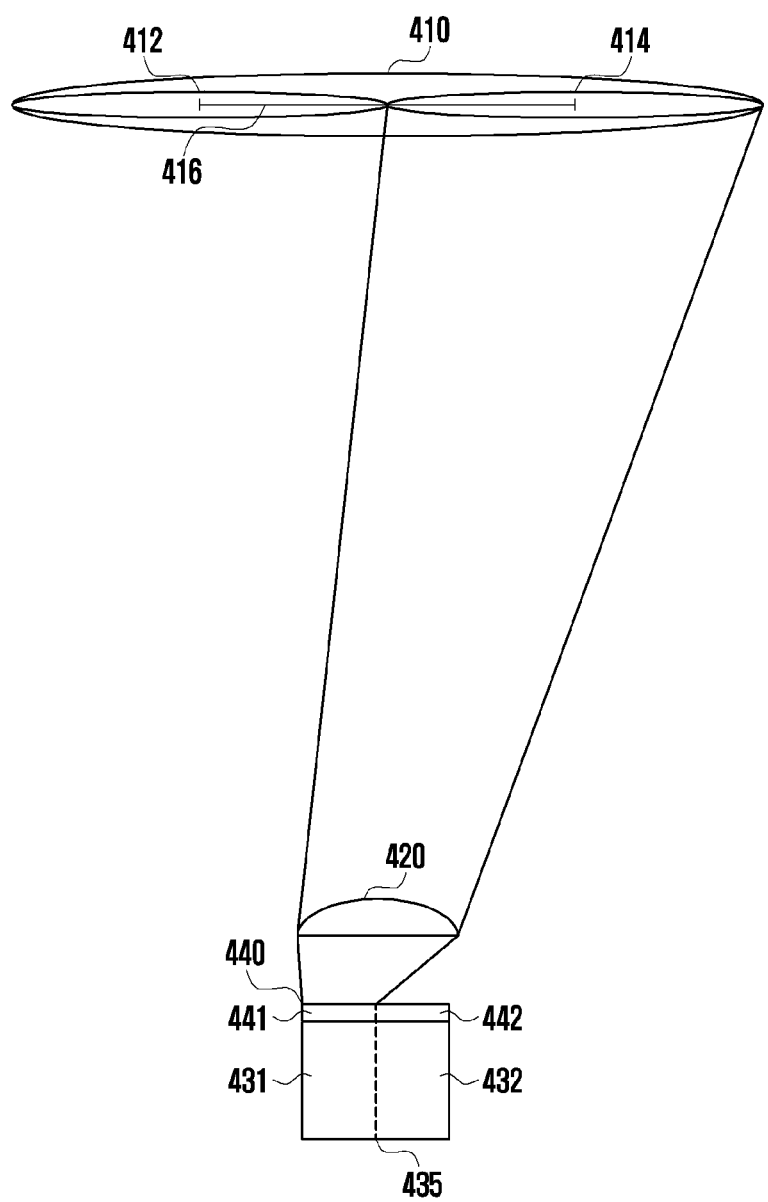
FIG. 4 shows a lens module, a micro lens, and a photo diode according to various embodiments.

FIG. 4 shows a lens module, a micro lens, and a photo diode according to various embodiments.

In FIG. 4, a lens 410 may be one of the lenses constituting a lens module (e.g., lens module 210 in FIG. 2), and the light passed through the lens 410 may enter the photo diode 430 through the micro lens 420. Here, the photo diode 430 may correspond to one of the subpixels 311, 312, 313, and 314 of FIG. 3.

According to various embodiments, the photo diode 430 may be split into two or more areas (e.g., first area 431 and second area 432). According to an embodiment, the photo diode 430 may have a floating diffusion region 435 that is formed in a lengthwise direction at its widthwise center and that is activated/deactivated according to a control signal from an image sensor IC (e.g., image sensor IC 260 in FIG. 3) or the processor (e.g., processor 120 in FIG. 1) of the electronic device. According to another embodiment, the photo diode 430 may have a barrier film for blocking light. According to another embodiment, the photo diode 430 may include a photo diode corresponding to the first area 431 and another photo diode corresponding to the second area 432. That is, the photo diode 430 may be formed by combining two photo diodes.

According to various embodiments, a filter array 440 composed of a first filter 441 and a second filter 442 may be arranged between the photo diode 430 and the micro lens 420.

According to an embodiment, if the floating diffusion region 435 is activated, the light passed through a right area 414 of the lens 410 may be refracted by the micro lens 410, pass the first filter 441, and enter the first area 431 of the photo diode 430, and the light passed through a left area 412 of the lens 410 may be refracted by the micro lens 410, pass the second filter 442, and enter the second area 432 of the photo diode 430.

According to various embodiments, the first filter 441 is configured to pass a first designated band light, and the second filter 442 may be configured to pass a second designated band light complementary in color to the first designated band light. For example, the filter array corresponding to the first photo diode may include the first filter 441 passing a red (R) band light and the second filter 442 passing a cyan (C) light complementary to the R band light. The filter array corresponding to the second photo diode (e.g., photo diode 312 in FIG. 3) and the third photo diode (e.g., photo diode 313 in FIG. 3) may each include a third filter passing a green (G) band light and a fourth filter passing a magenta (M) band light complementary to the G band light, and the filter array corresponding to the fourth diode (e.g., photo diode 314 in FIG. 3) may include a fifth filter passing a blue (B) band light and a sixth filter passing a yellow (Y) band light complementary to the B band light.

Figure 5:
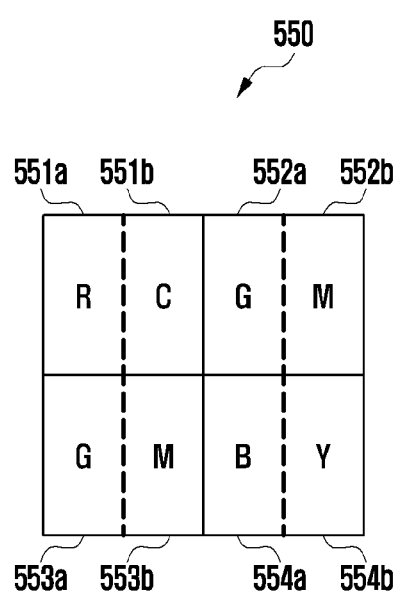
FIG. 5 is a diagram illustrating photo diodes each split into multiple areas by floating diffusion regions.

FIG. 5 is a diagram illustrating photo diodes each split into multiple areas by floating diffusion regions.

In the configuration of the image sensor module as shown in FIG. 4, four diodes constituting a unit pixel 550 may output RGB data (or first data) and CMY data (or second data) complementary to the RGB data. That is, a first photo diode 551 may be split to read out R data 551*a* and C data 551*b*, a second photo diode 552 and a third photo diode 553 are each split to read out G data 552*a* or 553*a* and M data 552*b* or 553*b*, and a fourth photo diode 554 may be split to read out B data 554*a* and Y data 554*b*.

An image sensor IC (e.g., image sensor IC 340 in FIG. 3) may read out the first data (e.g., RGB data 551*a*, 552*a*, 553*a*, and 554*a*) and the second data (e.g., CMY data 551*b*, 552*b*, 553*b*, and 554*b*) output from the first and second areas formed by the floating diffusion regions splitting the photo diodes 551, 552, 553, and 554.

Figure 6A:
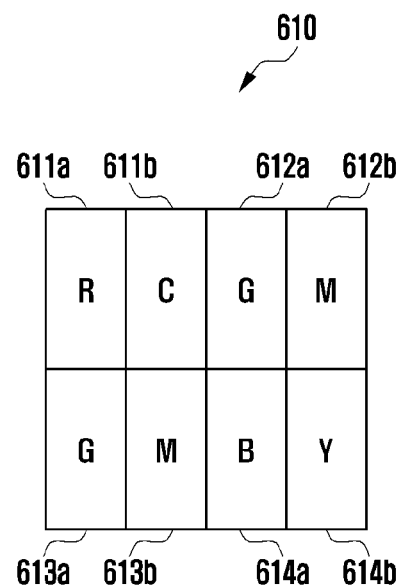
FIGS. 6A to 6C are diagrams for explaining a method for generating image data according to various embodiments.
Figure 6A:
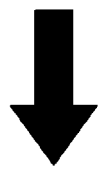
Figure 6A:
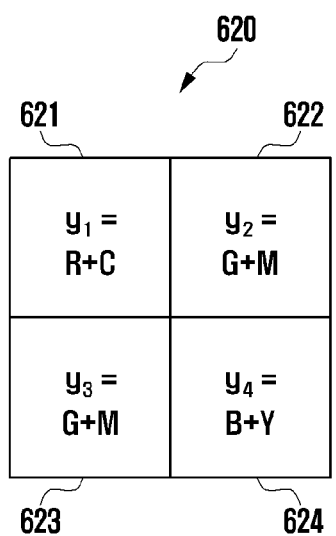
Figure 6B:
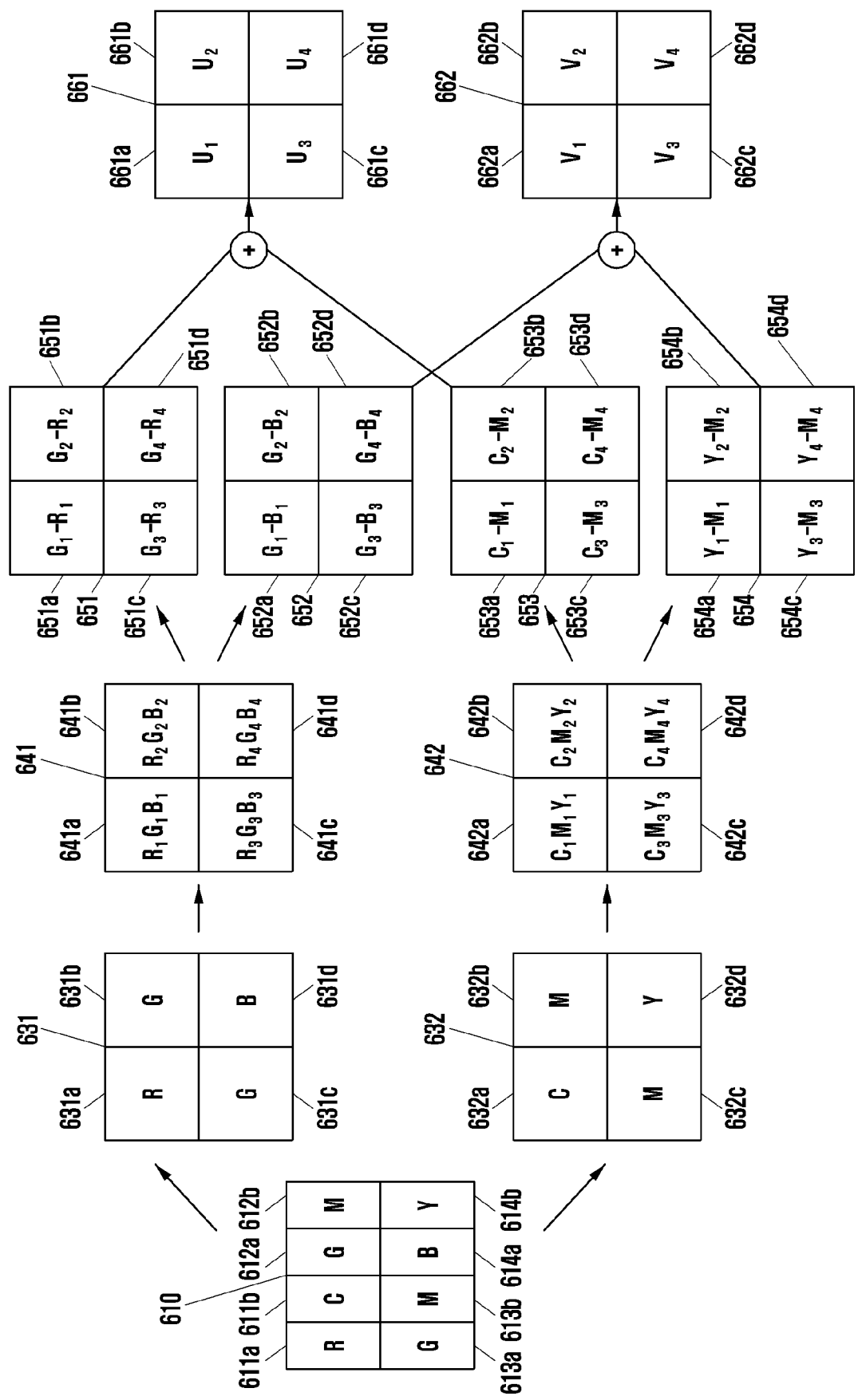
Figure 6C:
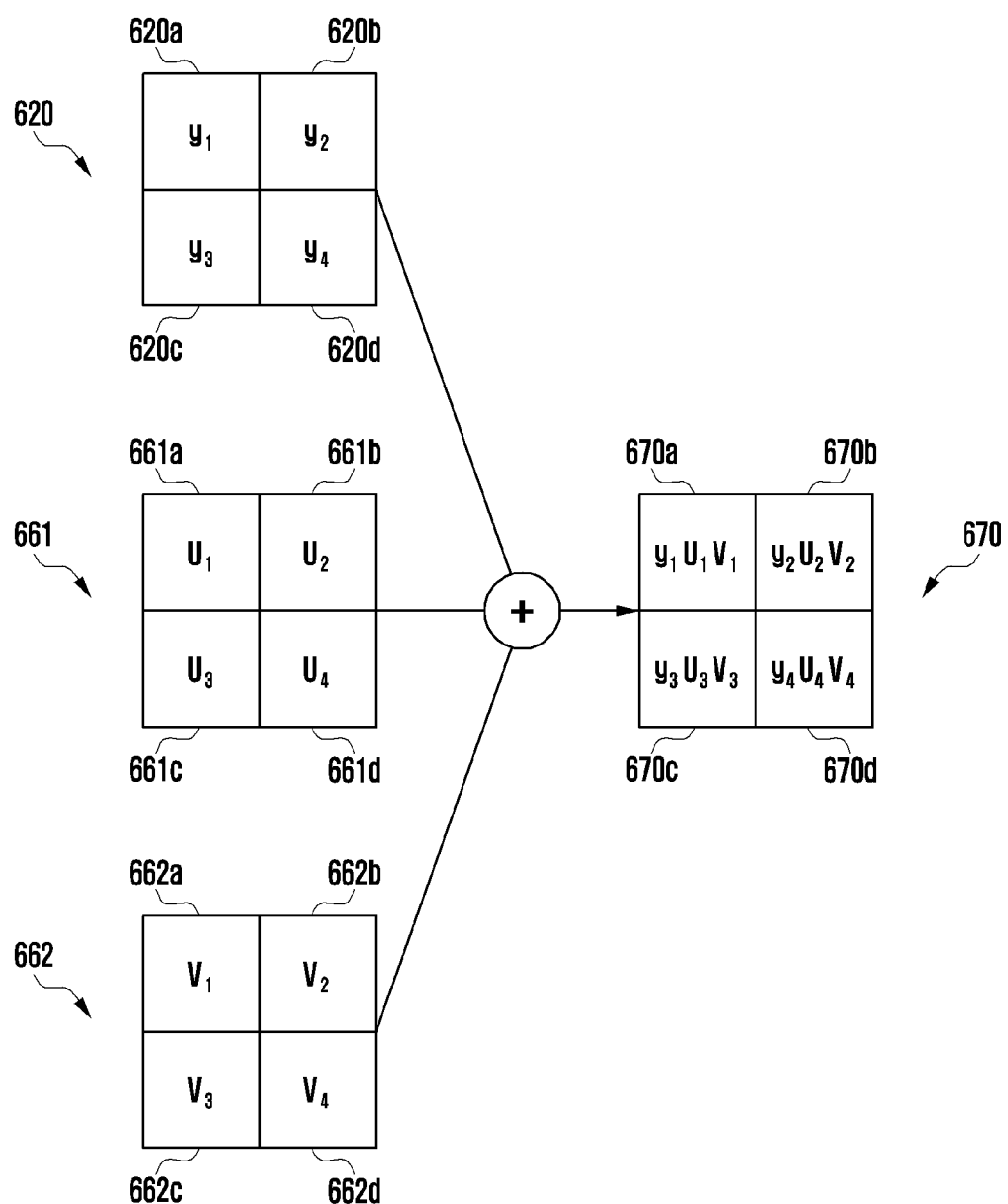

FIGS. 6A to 6C are diagrams for explaining a method for generating image data according to various embodiments.

In the following description, the image data generation method is performed by, but is not limited to, an image sensor IC (e.g., image sensor IC 260 of FIG. 2) of a camera module. For example, the image sensor IC of the camera module may just have a function of sending data output from the photo diodes to a processor (e.g., processor 120 in FIG. 1), which performs the image data processing procedure in an alternative embodiment. According to an alternative embodiment, the image sensor IC may send the data output from the photo diodes to a separate companion chip (or second processor) of the electronic device, which performs the image data generation procedure. According to an alternative embodiment, the image data generation procedure may be performed by an external device (e.g., server) as well as the electronic device (e.g., electronic device 1000 in FIG. 10 and electronic device 1100 in FIG. 11) equipped with the camera module 200.

According to various embodiments, the image signal processor may generate image data including brightness data and chrominance data by performing a simple operation on the first and second data complementary to each other without any extra computation procedure. The image data may be JPEG data, which may be yUV or yCbCr data.

FIG. 6 shows color data that can be sensed by the four photo diodes constituting a unit pixel. Although FIG. 6A exemplifies that floating diffusion regions or barrier films are formed across the centers of the respective photo diodes in the lengthwise direction, the number and locations of the floating diffusion regions or barrier films are not limited to the shown example.

According to various embodiments, the image signal processor may acquire first and second data output from each photo diode. As shown in FIG. 6A, unit pixel data may include the first data (e.g., RGB data 611*a*, 612*a*, 613*a*, and 614*a*) and the second data (e.g., CMY data 611*b*, 612*b*, 613*b*, and 614*b*).

According to various embodiments, the image signal processor may sum the first and second data to generate brightness data 620. For example, the image signal processor may sum R data 611*a* and C data 611*b* to generate brightness data y1 621 of a first subpixel, sum G data 612*a* and M data 612*b* to generate brightness data y2 622 of a second subpixel, sum G data 613*a* and M data 613*b* to generate brightness data y 623 of a third pixel, and sum B data 614*a* and Y data 614*b* to generate brightness data y4 614 of a fourth subpixel.

Because summing the color data complementary to each other produces mono data having the same RGB value, the image signal processor may be able to acquire the brightness data through a simple sum operation without any separate mono filter.

FIG. 6B shows a procedure of acquiring the chrominance data from the first and second data.

The image signal processor (e.g., image signal processor 265 in FIG. 2) may generate RGB data 641 of each subpixel from first data 631. Here, the RGB data 641 may be generated through interpolation on RGB data of neighboring subpixels. For example, it may be possible to generate RGB data $R_1G_1B_1$ 641*a* of the first subpixel with the R data of the first subpixel, an average value of the G data of upper, lower, left, and right subpixels of the first subpixel, and an average value of the B data of the upper-left, upper-right, lower-left, and lower-right subpixels of the first subpixel. Similarly, it may be possible to generate RGB data $R_2G_2B_2$ of the second subpixel with an average value of the R data of the left and right subpixels of the second subpixel, G data of the second subpixel, and an average value of the B data of the upper and lower subpixels of the second subpixel.

The image signal processor may generate CMY data 642 of each pixel from second data 632. The CMY data of each subpixel may be generated in the same manner as that performed to generate the RGB data of each-sub pixel. For example, it may be possible to generate CMY data $C_1M_1Y_1$ 642*a* with C data of the first subpixel, an average value of M data of upper, lower, left, and right sub pixels of the first subpixel, and an average value of Y data of the upper-left, upper-right, lower-left, and lower-right subpixels of the first subpixel. It may also be possible to generate CMY data $C_2M_2Y_2$ 642 of the second subpixel with an average value of C data of the left and right subpixel of the second subpixel, M data of the second subpixel, and an average value of Y data of the upper and lower subpixels of the second subpixel.

The image signal processor may generate first chrominance data 651 and 652 based on the RGB data acquired from the unit pixel. Here, the first chrominance data may include U data 651 (or Cb data) and V data 652 (or Cr data). The U data 651 may be acquired based on a difference between G and R values at the respective subpixels 641*a*, 641*b*, 641*c*, and 641*d* among the RGB data 641. For example, the image signal processor may calculate the difference between the G and R values ($G_1$–$R_1$) of the first subpixel 641*a* of the RGB data 641 to acquire the U data 651*a* of the first subpixel and the U data 651*b* of the second subpixel by calculating the difference between the G and R values of the second subpixel 641b. The V data 652 may be acquired based on the difference between the G and B values at the respective subpixels 641a, 641b, 641c, and 641d among the RGB data 641. For example, the image signal processor may calculate the difference between the G and B values ($G_1-B_1$) of the first subpixel 641a of the RGB data 641 to acquire the V data 652a of the first subpixel and calculate the difference between the G and B values ($G_2-B_2$) of the second subpixel 641b to acquire the V data 652b of the second subpixel.

The image signal processor may generate second chrominance data 653 and 654 based on the CMY data acquired from the unit pixel. Here, the second chrominance data may include U data 653 (or Cb data) and V data 654 (or Cr data). The U data 653 may be acquired based on a difference between C and M values at the respective subpixels 642a, 642b, 642c, and 642d among the CMY data 642. For example, the image signal processor may calculate the difference between the C and M values ($C_1-M_1$) of the first subpixel 642a of the CMY data 642 to acquire the U data 653a of the first subpixel and the U data 653b of the second subpixel by calculating the difference between the C and M values of the second subpixel 642b. The V data 654 may be acquired based on the difference between the Y and M values at the respective subpixels 642a, 642b, 642c, and 642d among the CMY data 642. For example, the image signal processor may calculate the difference between the Y and M values ($Y_1-M_1$) of the first subpixel 642a of the CMY data 642 to acquire the V data 654a of the first subpixel and calculate the difference between the Y and M values ($Y_2-M_2$) of the second subpixel 642b to acquire the V data 654b of the second subpixel.

The image signal processor may sum the U data 651 of the first chrominance data and the U data 653 of the second chrominance data. As described above, the U data 651 of the first chrominance data is obtained based on the difference between the G and R values at the respective subpixels among the RGB data 641, and the U data 653 of the second chrominance data is obtained based on the difference between the C and M values at the respective subpixels among the CMY data 642. Given the complementary relationship in which C=G+B, M=R+B, and C−M=(G+B)−(R+B)=G−R, the U data of the first and second chrominance data may be the same color component.

Likewise, the image signal processor may sum the V data 652 of the first chrominance and the V data 654 of the second chrominance. The V data 652 of the first chrominance is obtained based on the difference between the G and B values at the respective subpixels among the RGB data 641, and the V data 654 of the second chrominance data is obtained based on the difference between the Y and M values at the respective subpixels among the CMY data 642. Given the complementary relationship in which Y=R+G, M=R+B, and Y−M=(R+G)−(R+B)=G−B, the C data of the first and second chrominance data may be the same color component.

FIG. 6C shows a procedure for obtaining image data by summing the brightness data acquired through the procedure of FIG. 6A and the chrominance data acquired through the procedure of FIG. 6B.

The image signal processor may generate image data 670 by summing the brightness data 620 and the first and second chrominance data 661 and 662. As shown in the drawing, the image data 670 may be yUV data (or yCbCr data).

According to various embodiments, it may be possible for the image signal processor to produce the same result as that using the legacy image sensor having only one pixel below the micro sensor through the procedure described with reference to FIGS. 6A to 6C. The image signal processor may output only the brightness and chrominance data generated as described above or Bayer data through Bayer patternization. In this case, because the process performed at the image signal processor can be followed by a legacy process, it may be possible to change the design of the processor of the electronic device independently of the subsequent process and acquire the image data without any extra calculation.

Figure 7:
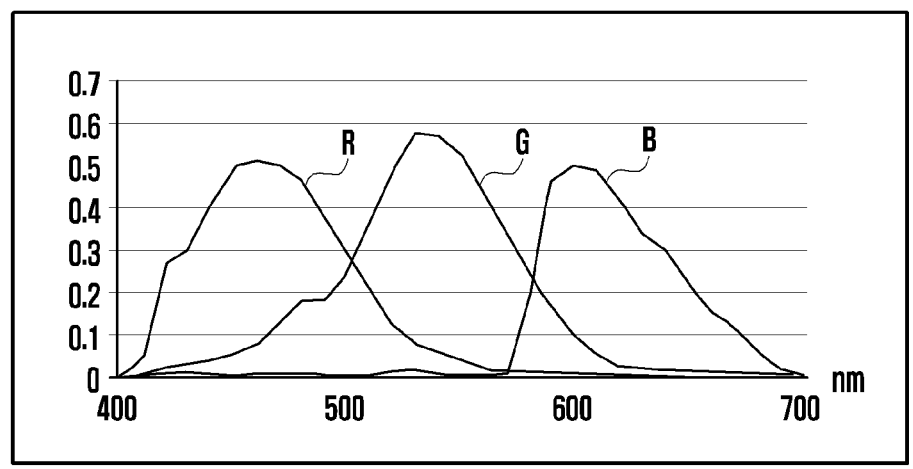
FIG. 7 is a diagram illustrating graphs of wavelength ranges of image data according to various embodiments.
Figure 7:
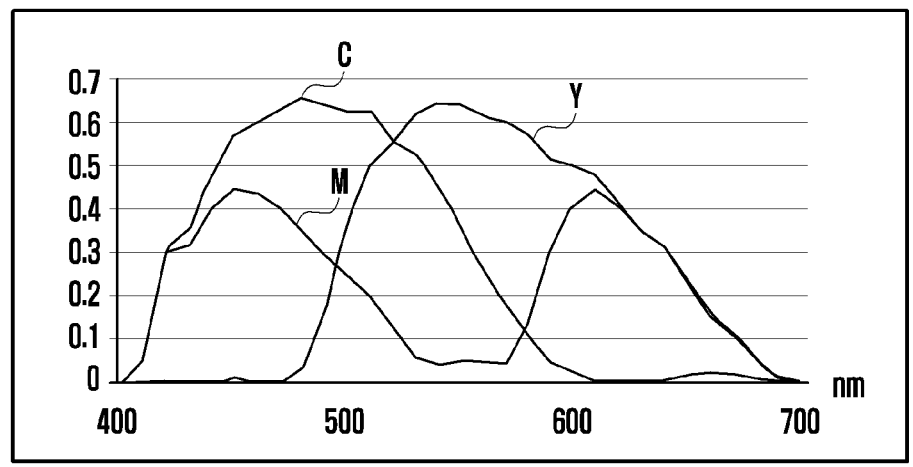

FIG. 7 is a diagram illustrating graphs of wavelength ranges of image data according to various embodiments.

According to various embodiments, an image signal processor (image signal processor 265 in FIG. 2) may acquire RGB data (or first data) and CMY data (second data) from photo diodes of a unit pixel. The left part of FIG. 7 shows a wavelength range of the RGB data, and the right part of FIG. 7 shows a wavelength of the CMY data.

As shown in the drawing, because the wavelength ranges of the components of the CMY data are broader than the wavelength ranges of the components of the RGB data, the sensitivity of the CMY data may be about 2 times higher. Given this sensitivity difference, a camera module may be designed in various manners.

In the first embodiment, the image sensor may be designed to generate a sensitivity difference of two times between RGB and CMY filters by equating the penetration ratios of the filters. In this embodiment, the camera module may adjust the auto exposure based on the CMY data because CMY is early saturated in a bright scene. In this case, it may be possible to generate a 1-stop HDR image by synthesizing the RGB and CMY data, because the RGB data has a light amount half that of the CMY data, and reduce synthesizing error in synthesizing a moving subject because the high sensitivity CMY data-based auto exposure makes it possible to reduce the shutter speed by half that of a legacy camera module using RGB data. For dark scenes with a small light amount, the auto exposure may be adjusted based on the RGB data and, in this case, it may be possible to render dark areas in the image data because the CMY data has a high sensitivity.

In the second embodiment, the image sensor may be designed to adjust the penetration ratio of the CMY filter such that the CMY penetration sensitivity becomes equal to the RGB penetration sensitivity. This is advantageous in view of white balancing without compromising the functionality of the legacy camera module.

In the third embodiment, the image sensor may be designed to read and store CMY in a storage diode at one time, controlling the auto exposure based on the RGB, by arranging the storage diode being applied to a global shutter in a CMY pixel. Even in this case, it is advantageous to guarantee the functionality of the legacy camera module.

According to various embodiments, the image signal processor may adjust white balance of the image data based on the first and second data. The camera module may perform sampling based on the wavelength of the data acquired from a photo diode and estimate a color temperature of a light source based on a sampled value. According to various embodiments, the RGB and CMY data are complementary to each other and each have three wavelength bands such that the image signal processor may perform sampling in a total of 6 bands. Because the white balancing is performed with respect to the 6 bands, it may be possible to improve estimation accuracy on the color temperature of a light source.

Figure 8:
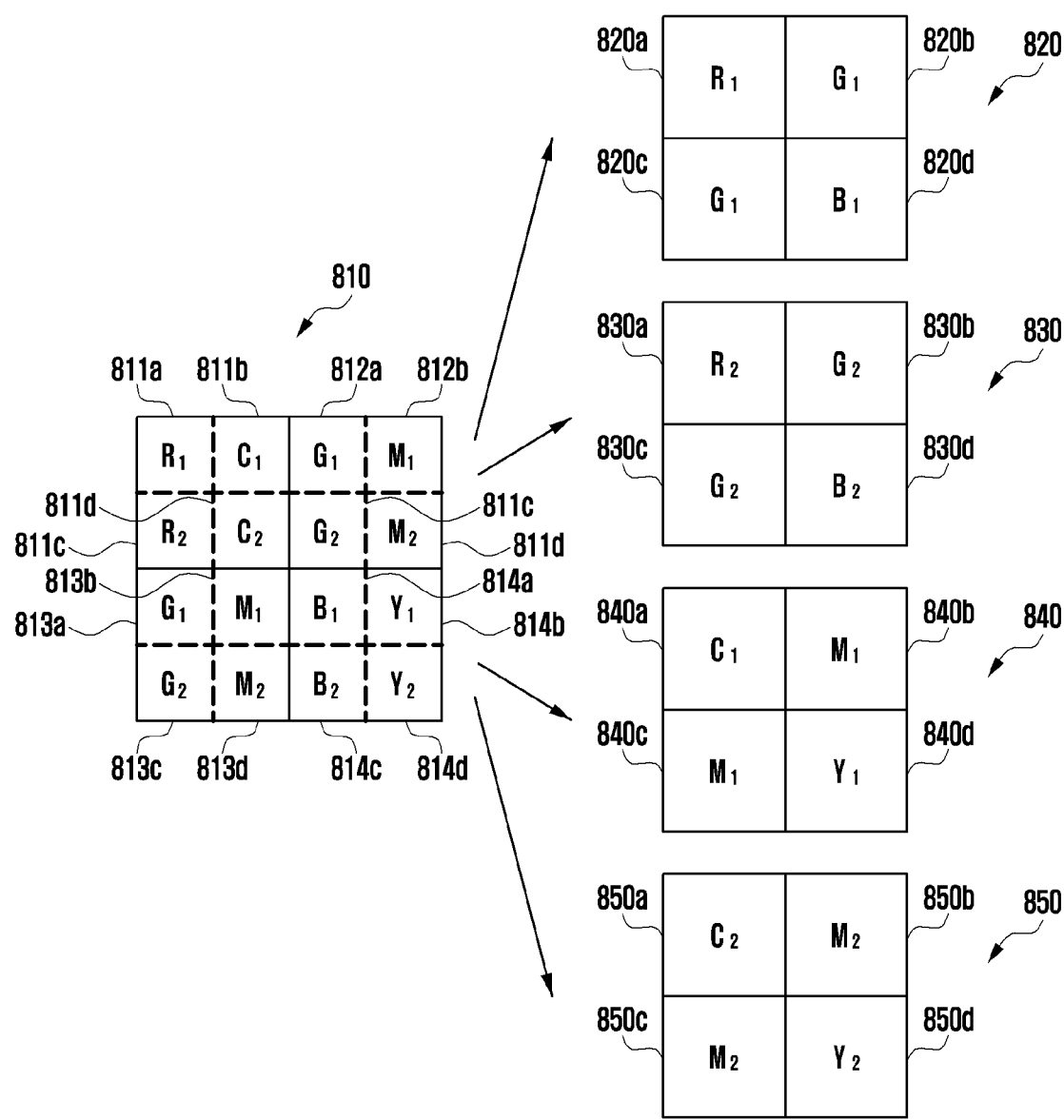
FIG. 8 is a diagram illustrating photo diodes each split into multiple areas by floating diffusion regions or barrier films according to various embodiments.

FIG. 8 is a diagram illustrating photo diodes each split into multiple areas by floating diffusion regions or barrier films according to various embodiments.

According to various embodiments, a photo diode may be split into multiple areas by the floating diffusion regions or barrier films. The following description is made under the assumption that a photo diode is split into the multiple areas by the floating diffusion regions.

According to various embodiments, a photo diode may be split into four areas (e.g., areas 811*a*, 811*b*, 811*c*, and 811*d*) by first and second floating diffusion regions. In this embodiment, a filter array corresponding to each photo diode may include first to fourth filters corresponding respectively to first to fourth areas of the photo diode. For example, the first and third filters that each pass an R band are arranged for the first area 811*a* and the third area 811*c* of the first diode of a unit pixel, and the second and fourth filters that each pass a C band are arranged for the second and fourth areas 811*b* and 811*d* of the first diode. Likewise, the first and third filters that each pass a G band are arranged for the first and third areas 812*a* and 812*c* of the second diode, and the second and fourth filters that each pass an M band are arranged for the second and fourth areas 812*b* and 812*d* of the second diode.

Each photo diode may read out first to fourth data 820, 830, 840, and 850 acquired at the first to fourth areas independently of each other, and the image signal processor may generate four pieces of data based on the first to fourth area-specific data output from the respective photo diodes. The image signal processor may generate brightness data and chrominance data based on the acquired data and proceed to generate image data as described with reference to FIGS. 6A to 6C.

In this embodiment, a photo diode may be split into four areas with two floating diffusion regions; because phase auto focusing (AF) can be performed in both the horizontal and vertical directions, it is possible to improve the AF function in comparison with the legacy technology.

Figure 9:
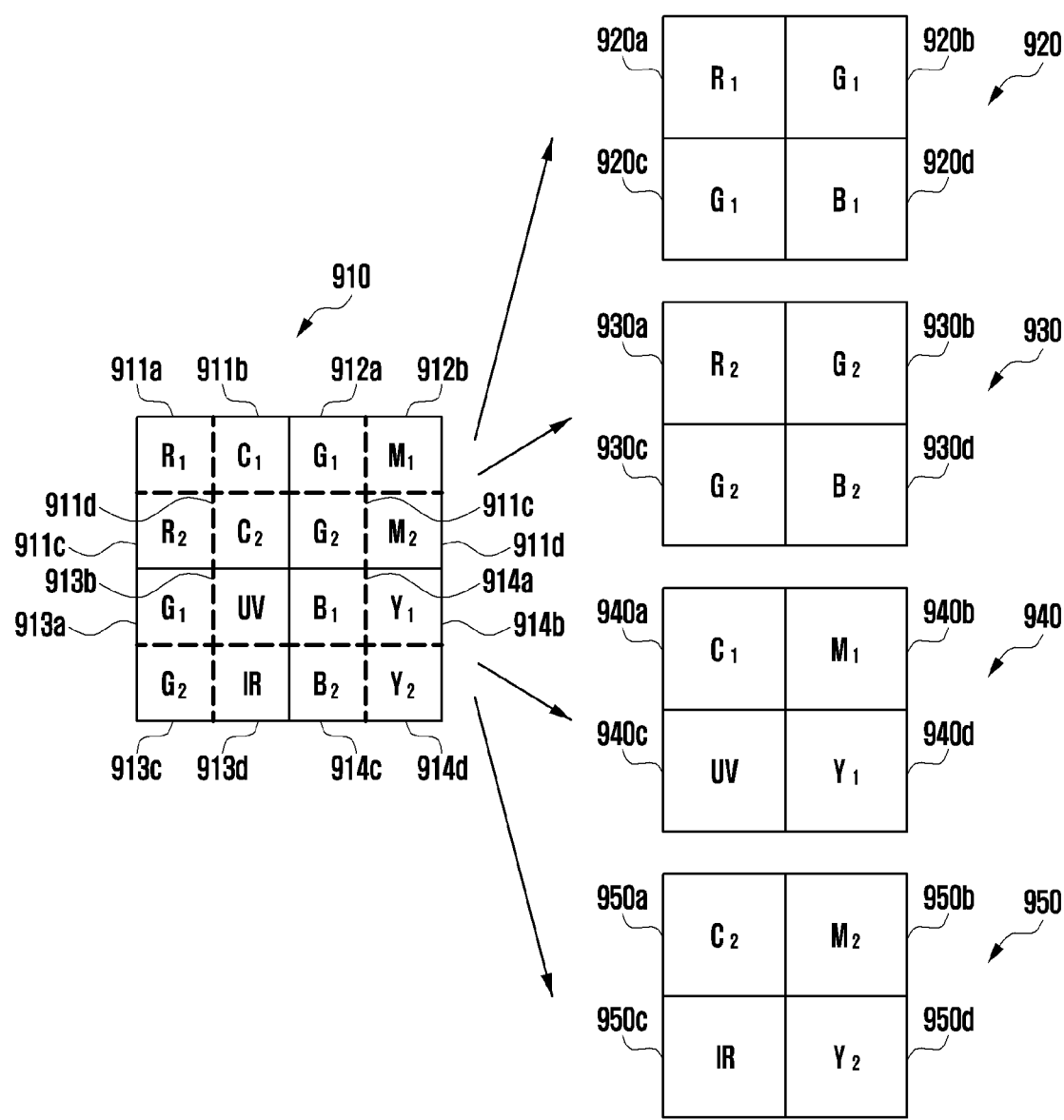
FIG. 9 is a diagram illustrating photo diodes each split into multiple areas by floating diffusion regions according to various embodiments.

FIG. 9 is a diagram illustrating photo diodes each split into multiple areas by floating diffusion regions according to various embodiments.

According to various embodiments, a photo diode may be split into four areas (e.g., areas 911*a*, 911*b*, 911*c*, and 911*d*) by first and second floating diffusion regions, and a filter array corresponding to each photo diode may include first to fourth filters corresponding respectively to first to fourth areas of the photo diode.

In this embodiment, some of at least one photo diode may be configured to pass light outside a visible light spectrum. For example, a filter array corresponding to the at least one photo diode may include a third filter for passing a third designated band (ultraviolet (UV) ray band) of light that contains frequencies higher than those of the first and second designated bands, a fourth filter for passing a fourth designated band (infrared (IR) ray band) of light that contains frequencies lower than those of the first and second designated bands.

In reference to FIG. 9, with respect to the third subpixel, a filter passing the G band of light is arranged for each of the first and third areas 913*a* and 913*c*, a third filter passing the UV band of light is arranged for the second area 913*b*, and a fourth filter passing the IR band of light is arranged for the fourth area 913*d*.

In this case, third data 940 output from the photo diode may include UV data 940*c* of the third pixel, and fourth data 950 output from the photo diode may include IR data 950*c* of the third subpixel.

In this embodiment, the camera module is capable of acquiring data corresponding to a total of 8 bands including the UC and IR bands in addition to the RGB and CMY bands, which leads to improve white balancing and AF functions.

According to various disclosed embodiments, a camera module 200 may include a lens module 210 including at least one lens and an image sensor module 230 connected to the lens module 210, wherein the image sensor module 230 includes a micro lens 232, at least one photo diode 234, and a filter array 236 including a first filter passing a first designated band of light and a second designated filter passing another band of the light, the first and second designated bands corresponding to colors complementary to each other, and arranged between the micro lens 232 and the at least one photo diode 234.

According to various embodiments, the at least one photo diode 234 may include a first area sensing the light passing through the first filter and a second area sensing the light passing through the second filter.

According to various embodiments, the at least one photo diode 234 may be configured to acquire first data corresponding to the light sensed in the first area and second data corresponding to the light sensed in the second area.

According to various embodiments, the camera module may further include an image signal processor 265 configured to receive the first and second data.

According to various embodiments, the image signal processor 265 may be configured to generate brightness data by summing the first and second data.

According to various embodiments, the image signal processor 265 may be configured to generate first chrominance data based on the first data, second chrominance data based on the second data, and third chrominance data by summing the first and second chrominance data.

According to various embodiments, the image signal processor 265 may be configured to generate image data based on the brightness data and the third chrominance data.

According to various embodiments, the image signal processor 265 may be configured to transfer the first and second data to an external processor outside the camera module 200 through an interface.

According to various embodiments, the image signal processor 265 may be configured to adjust a white balance of the image data based on the first and second data.

According to various embodiments, the filter array 236 may include a third filter passing a third designated band of the light that may be higher in frequency than the first and second designated bands and a fourth filter passing a fourth designated band of the light that may be lower in frequency than the first and second designated bands.

According to various embodiments, the image sensor module 230 may include a plurality of photo diodes 234 and a plurality of filter arrays 236 corresponding to the plurality of photo diodes 234, the plurality of photo diodes 234 and the plurality of filter arrays 236 being configured to form at least one pixel.

According to various embodiments, the at least one photo diode 234 may be split into the first and second areas based on a floating diffusion region being activated or by a metal film.

Figure 10:
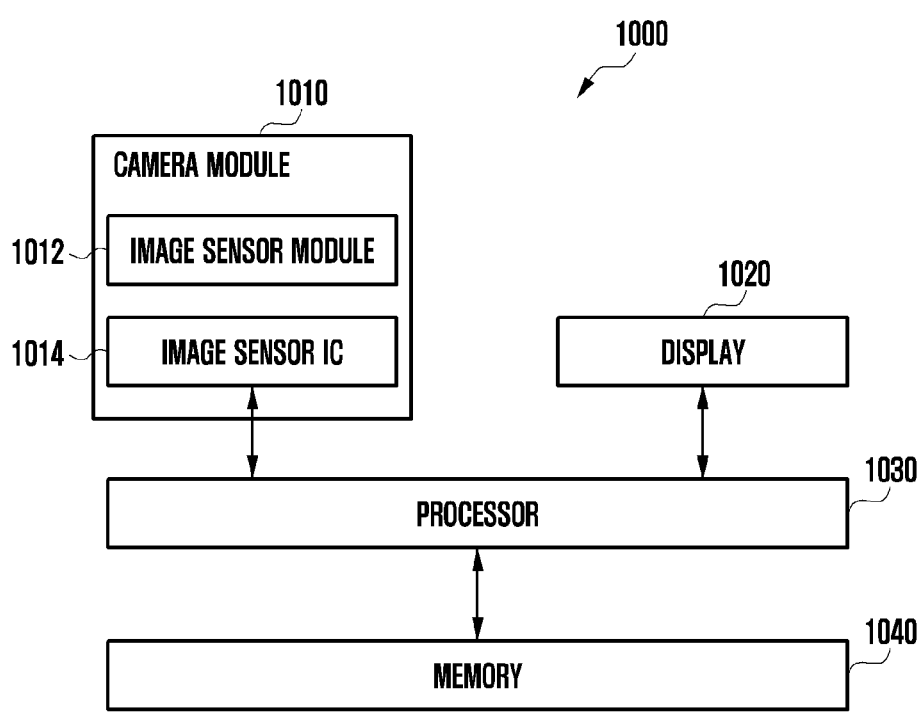
FIG. 10 is a block diagram illustrating a configuration of an electronic device according to various embodiments.

FIG. 10 is a block diagram illustrating a configuration of an electronic device according to various embodiments.

As shown in the drawing, the electronic device 1000 may include a camera module 1010, a display 1020, a processor 1030, and a memory 1040 of which at least part may be omitted or replaced according to various disclosed embodiments. The electronic device 1000 may further include at least part of the components and/or functions of the electronic device 101 of FIG. 1.

The following description is directed to the function of processing image data acquired by the camera module 1010 among various functions of the electronic device, and the technical features that already have been described above with reference to FIGS. 1 to 9 are omitted hereinbelow.

The display 1020 is a component for displaying an image and may be implemented with a liquid crystal display (LCD), a light-emitting diode (LED) display, or an organic LED (OLED) display. The display 1020 may include at least part of the configuration and/or functionality of the display device 160 of FIG. 1.

The memory 1040 may include a volatile memory (e.g., volatile memory 132 in FIG. 1) and/or non-volatile memory (e.g., non-volatile memory 134) and may be electrically connected with the processor 310. The memory 1040 may store various instructions executable by the processor 1030. The instructions may include control commands for arithmetical and logical operations, data transfer, and input/output. The memory 10400 may also store at least part of the program 140 of FIG. 1.

The processor 1030 may be configured to control the components of the electronic device 1000 and/or perform communication-related operations and data processing and may include at least part of the configuration and/or functionality of the processor 120 of FIG. 1. The processor 1030 may be electrically connected to each component (e.g., memory 320, display 1020, camera module 1010, and display 1020) of the electronic device 1000.

The camera module 1010 may include an image sensor module 1012 and an image sensor IC 1014.

The image sensor module 1012 may include a plurality of photo diodes constituting a pixel, micro lens arranged so as to correspond to the photo diodes, and a filter array arranged between the photo diodes and the micro lens. The filter array may include a first filter passing a first designated band of light and a second filter passing a second band of light, the first and second bands corresponding to colors complementary to each other.

If a floating diffusion region formed in a photo diode is activated, the photo diode may be split into a first area and a second area and detect and output the light passed through a first filter in the first area and the light passed through a second filter in the second area.

According to various embodiments, the image sensor IC 1014 may generate image data based on first and second data output from the photo diode. The image data generation operation of the image sensor IC 1014 has been described above with reference to FIGS. 6A to 6C.

According to various embodiments, the image sensor IC 1014 may transfer the data (e.g., first and second data) output from the photo diode to the processor 1030, and the processor 1030 may process the data output from the image sensor IC 1014 to generate image data. The image sensor IC 1014 and the processor 1030 may be connected through a well-known interface (e.g., mobile industry processor interface (MIPI)). The processor 1030 may also perform at least part of the operations of the image sensor IC 1014 that have been described above with reference to FIGS. 2 to 9.

Figure 11:
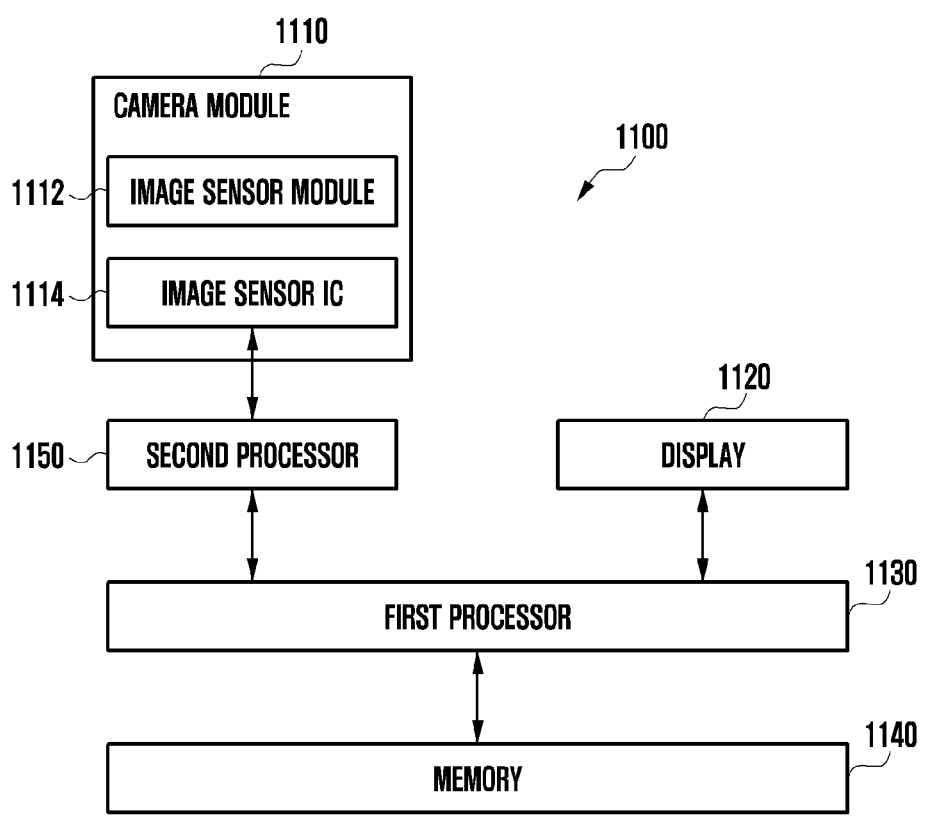
FIG. 11 is a block diagram illustrating a configuration of an electronic device according to various embodiments.

FIG. 11 is a block diagram illustrating a configuration of an electronic device according to various embodiments.

As shown in the drawing, the electronic device 1100 may include a camera module 1110, a display 1120, a first processor 1130, a second processor 1150, and a memory. The camera module 1110, the display 1120, and the memory 1140 may be identical in configuration with the camera module 1010, the display 1020, and the memory 1040 of FIG. 10. The processor 1130 may be identical in configuration with the processor 1030 of FIG. 10.

The second processor 1150 may be interposed between the camera module 1110 and the first processor 1130 in the electronic device 1100. The second processor 1150 may be implemented as a separate chip (e.g., companion chip) that is capable of at least part of the functionality of the first processor 1130. According to various embodiments, the image sensor IC 1114 may output data (e.g., first and second data) from the photo diode to the second processor 1150, and the second processor 1150 may process the data from the image sensor IC 1114 to generate image data. The second processor 1150 may output the generated image data to the first processor 1130.

According to various disclosed embodiments, an electronic device 1000 may include a camera module 1010 and an image signal processor (e.g., processor 1030), wherein the camera module 1010 includes a micro lens 232, at least one photo diode 234 for converging light passing the micro lens 232 to an electric signal, and a filter array 236 arranged between the micro lens 232 and the at least one photo diode 234 and including a first filter passing a first designated band of the light and a second filter passing a second designated band of the light, the first and second designated bands corresponding to colors complementary to each other and the image signal processor being configured to generate image data based on data output from the at least one photo diode 234.

According to various embodiments, the at least one photo diode 234 may include a first area sensing the light passing through the first filter and a second area sensing the light passing through the second filter.

According to various embodiments, the at least one photo diode 234 may be configured to acquire first data corresponding to the light sensed in the first area and second data corresponding to the light sensed in the second area, and the image signal processor may be configured to generate the image data based on the first and second data.

According to various embodiments, the image signal processor may be configured to generate brightness data by summing the first and second data, first chrominance data based on the first data, second chrominance data based on the second data, third chrominance data by summing the first and second chrominance data, and image data based on the brightness data and the third chrominance data.

According to various embodiments, the image signal processor may include at least one of an application processor of the electronic device 1000, an image sensor IC of the camera module 1010, or a companion chip that may be electrically connected to the application processor and the camera module 1010.

Figure 12:
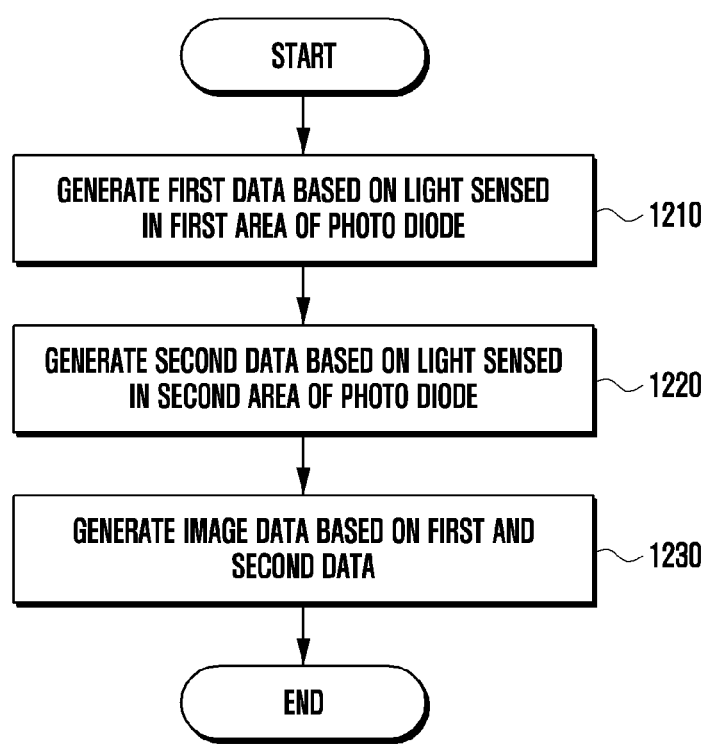
FIG. 12 is a flowchart illustrating an image data generation method according to various embodiments.

FIG. 12 is a flowchart illustrating an image data generation method according to various embodiments.

The disclosed method may be performed by a camera module (e.g., image sensor IC 340) described with reference to FIG. 3. According to an alternative embodiment, the disclosed method may be performed by the electronic device (e.g., processor 1030) of FIG. 10 and/or the electronic device (e.g., first processor 1130 and/or second processor 1150) of FIG. 11.

According to various embodiments, the camera module may include a micro lens, a photo diode arranged to correspond to the micro lens, and a filter array arranged between the micro lens and the photo diode.

At operation 1210, the camera module may generate first data based on the light sensed in a first area of the photo diode. For example, the first data may be RGB data.

At operation 1220, the camera module may generate second data based on the light sensed in a second area of the photo diode. For example, the second data may be CMY data.

According to various embodiments, a first filter arranged for the first area of the diode and a second filter arranged for the second area of the photo diode are configured to pass colors complementary to each other such that the first and second data may correspond to the colors complementary to each other.

At operation 1230, the camera module may generate image data based on the first and second data. A detailed description of the method for generating the image data based on the first and second data has been made above with reference to FIGS. 6A to 6C.

FIG. 13 is a flowchart illustrating an image data generation method according to various embodiments.

At operation 1310, a camera module may generate first data based on the light sensed in a first area of a photo diode and second data based on the light sensed in a second area of the photo diode.

At operation 1320, the camera module may generate brightness data by summing the first and second data. Because the first and second data correspond to colors complementary to each other as described above, if the first and second data are summed, the R, G, and B components become identical in size with each other so as to have brightness components.

At operation 1330, the camera module may generate first chrominance data based on the first data. Simultaneously at least in part with operation 1330, the camera module may generate second chrominance data based on the second data at operation 1340.

At operation 1340, the camera module may generate third chrominance data by summing the first and second chrominance data.

At operation 1350, the camera module may generate the third chrominance data by summing the brightness data and the second chrominance data.

At operation 1360, the camera module may generate image data by synthesizing the brightness data and the third chrominance data.

According to various disclosed embodiments, an image data generation method of a camera module including a micro lens, at least one photo diode arranged to correspond to the micro lens, and a filter array arranged between the micro lens and the at least one photo diode may include generating first data based on light sensed in a first area of the at least one photo diode at operation 1210, generating second data based on the light sensed in a second area of the at least one photo diode at operation 1220, and generating image data based on the first and second data at operation 1230, the first and second data corresponding to colors complementary to each other.

According to various embodiments, the at least one photo diode may include a first area sensing the light passing through the first filter and a second area sensing the light passing through the second filter, and the filter array may include the first filter corresponding to the first area and passing a first designated band of the light and the second filter corresponding to the second area and passing a second designated band of the light, the first and second designated bands corresponding to colors complementary to each other.

According to various embodiments, generating the image data may include generating brightness data by summing the first and second data, generating first chrominance data based on the first data, generating second chrominance data based on the second data, generating third data by summing the first and second chrominance data, and generating the image data based on the brightness data and the third chrominance data.

The invention claimed is:

1. A camera module comprising:
   a lens module comprising at least one lens;
   an image signal processor; and
   an image sensor module connected to the lens module,
   wherein the image sensor module comprises:
      a micro lens;
      a photo diode comprising at least two areas that are configured to sense a light intensity independently from each other, wherein the photo diode is configured to read out separate data from each of the at least two areas; and
      a filter array comprising a first filter passing a first designated band of light, a second filter passing a second designated band of the light, a third filter passing a third designated band of light and a fourth filter passing a fourth designated band of light, the first and second designated bands corresponding to colors complementary to each other and the third and fourth designated bands corresponding to colors complementary to each other,
   wherein the photo diode is split into first and second areas based on a first floating diffusion region being activated, and wherein the photo diode is split into third and fourth areas based on a second floating diffusion region being activated,
   wherein the image sensor module is configured to:
      acquire first data corresponding to light sensed in the first area and second data corresponding to light sensed in the second area based on an activation of the first floating diffusion region, the first data and the second data being acquired independently from each other, or
      acquire third data corresponding to light sensed in the third area and fourth data corresponding to light sensed in the fourth area based on an activation of the second floating diffusion region, the third data and the fourth data being acquired independently from each other, and
   wherein the image signal processor is configured to generate brightness data by summing the first and second data or summing the third and fourth data.

2. The camera module of claim 1, wherein the image signal processor is configured to generate first chrominance data based on the first data, second chrominance data based on the second data, and third chrominance data by summing the first and second chrominance data.

3. The camera module of claim 2, wherein the image signal processor is configured to generate image data based on the brightness data and the third chrominance data.

4. The camera module of claim 1, wherein the image signal processor is configured to transfer the first and second data to an external processor outside the camera module through an interface.

5. The camera module of claim 1, wherein the image signal processor is configured to adjust a white balance of image data based on the first and second data.

6. The camera module of claim 1, wherein the third designated band of the light is higher in frequency than the first and second designated bands and the fourth designated band of the light is lower in frequency than the first and second designated bands.

7. The camera module of claim 1, wherein the image sensor module comprises:
a plurality of photo diodes; and
a plurality of filter arrays corresponding to the plurality of photo diodes, the plurality of photo diodes and the plurality of filter arrays being configured to form at least one pixel.

8. An electronic device comprising:
a camera module; and
an image signal processor,
wherein the camera module comprises:
a micro lens;
a photo diode for converting light passing the micro lens to an electric signal, the photo diode comprising at least two areas that are configured to sense a light intensity independently from each other, wherein the photo diode is configured to read out separate data from each of the at least two areas;
a filter array comprising a first filter passing a first designated band of the light, a second filter passing a second designated band of the light, a third filter passing a third designated band of light and a fourth filter passing a fourth designated band of light, the first and second designated bands corresponding to colors complementary to each other and the third and fourth designated bands corresponding to colors complementary to each other; and
an image sensor module,
wherein the photo diode is split into first and second areas based on a first floating diffusion region being activated, third and fourth areas based on a second floating diffusion region being activated,
wherein the image sensor module is configured to:
acquire first data corresponding to light sensed in the first area and second data corresponding to light sensed in a second area based on the image signal processor activating the first floating diffusion region, the first data and the second data acquired independently from each other, or
acquire third data corresponding to light sensed in the third area and fourth data corresponding to light sensed in the fourth area based on the image signal processor activating the second floating diffusion region, the third data and the fourth data acquired independently from each other, and
wherein the image signal processor is configured to generate brightness data by summing the first and second data or summing the third and fourth data.

9. The electronic device of claim 8, wherein the image signal processor is configured to generate first chrominance data based on the first data, second chrominance data based on the second data, third chrominance data by summing the first and second chrominance data, and image data based on the brightness data and the third chrominance data.

10. The electronic device of claim 8, wherein the image signal processor comprises at least one of an application processor of the electronic device, an image sensor IC of the camera module, or a companion chip that is electrically connected to the application processor and the camera module.

11. An image data generation method of a camera module comprising a micro lens, a photo diode arranged to correspond to the micro lens, the photo diode comprising at least two areas that are configured to sense a light intensity independently from each other, the photo diode configured to read out separate data from each of the at least two areas, and a filter array comprising a first filter passing a first designated band of light, a second filter passing a second designated band of the light, a third filter passing a third designated band of light and a fourth filter passing a fourth designated band of light, the first and second designated bands corresponding to colors complementary to each other, the third and fourth designated bands corresponding to colors complementary to each other, wherein the photo diode is split into first and second areas based on a first floating diffusion region being activated and third and fourth areas based on a second floating diffusion region being activated, the method comprising:
acquiring, by an image sensor module, either:
first data corresponding to the light sensed in the first area and second data corresponding to the light sensed in a second area based on an image signal processor activating the first floating diffusion region, the first data and the second data being acquired independently from each other, or
third data corresponding to the light sensed in the third area and fourth data corresponding to the light sensed in the fourth area based on the image signal processor activating the second floating diffusion region, the third data and the fourth data being acquired independently from each other; and
generating, by the image signal processor, brightness data by summing the first and second data or summing the third and fourth data.

12. The method of claim 11, wherein:
the first and second designated bands correspond to colors complementary to each other, and
the third and fourth designated bands correspond to colors complementary to each other.

13. The method of claim 11, further comprising:
generating first chrominance data based on the first data;
generating second chrominance data based on the second data;
generating third chrominance data by summing the first and second chrominance data; and
generating image data based on the brightness data and the third chrominance data.

* * * * *

UNITED STATES PATENT AND TRADEMARK OFFICE
CERTIFICATE OF CORRECTION

PATENT NO. : 11,558,587 B2
APPLICATION NO. : 16/759246
DATED : January 17, 2023
INVENTOR(S) : Jang et al.

It is certified that error appears in the above-identified patent and that said Letters Patent is hereby corrected as shown below:

On the Title Page

Column 1, Item (87), Line 1, "WO2019/055407" should read --WO2019/088407--.

Signed and Sealed this
Eleventh Day of April, 2023

Katherine Kelly Vidal
*Director of the United States Patent and Trademark Office*